Aug. 11, 1942.　　F. BERRY　　2,292,987

HYDRAULIC CLUTCH

Filed March 15, 1941　　3 Sheets-Sheet 1

Inventor

*Frank Berry*

By Mason Fenwick & Lawrence
Attorneys

Aug. 11, 1942.   F. BERRY   2,292,987
HYDRAULIC CLUTCH
Filed March 15, 1941   3 Sheets-Sheet 2

Inventor
Frank Berry
By Mason Fenwick & Lawrence
Attorneys

Aug. 11, 1942.  F. BERRY  2,292,987
HYDRAULIC CLUTCH
Filed March 15, 1941  3 Sheets-Sheet 3
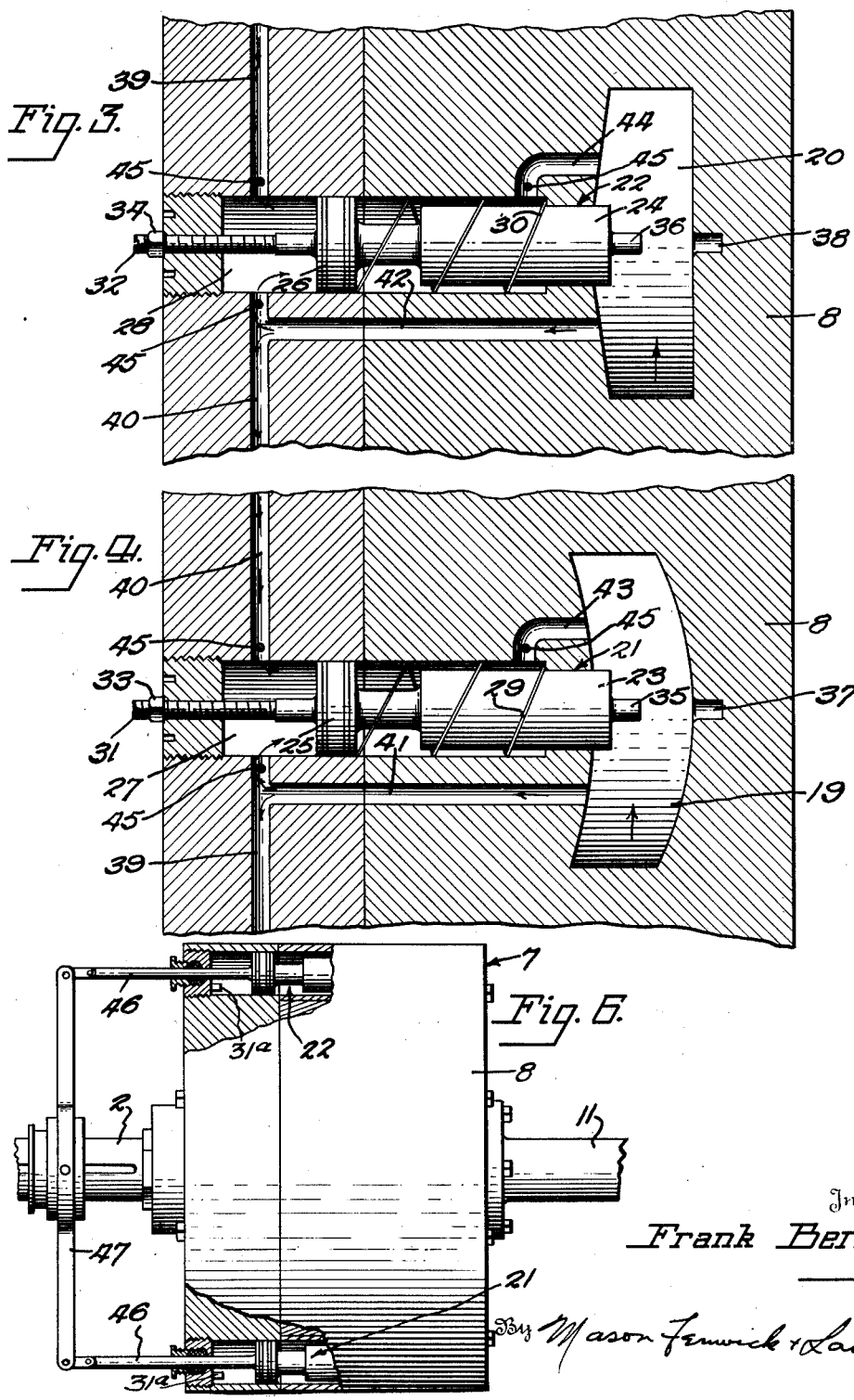

Patented Aug. 11, 1942

2,292,987

UNITED STATES PATENT OFFICE 2,292,987

HYDRAULIC CLUTCH

Frank Berry, Corinth, Miss., assignor to W. L. McPeters, as trustee, Corinth, Miss.

Application March 15, 1941, Serial No. 383,629

15 Claims. (Cl. 192—58)

This invention relates to a hydraulic clutch of the basic type in which a rotary piston on a driving shaft travels about an annular cylinder in a surrounding casing, the latter being fixed to a driven shaft. A column of liquid fills the cylinder and the coupling thrust is transmitted from the piston through the liquid column against an abutment carried by the driven member, and which normally closes the cylinder.

It is, of course, essential for the disengagement of such a clutch that means be provided to release the pressure upon the abutment by by-passing the liquid around the abutment so as to permit free displacement of the liquid by the piston, and means must also be provided for gradually and progressively throttling the by-pass, increasing the pressure of the liquid column for gradually taking up the load of the driven member without grabbing.

In a clutch of this type, the differential rotation of the driving and driven parts makes it necessary that the piston shall periodically pass through the abutment, the two being synchronously driven, and the abutment having a transition chamber coming into phase with the piston to effect the passage of the latter from the high to the low pressure side of the cylinder.

When the abutment chamber is in a position communicating commonly with the high and low pressure sides of the cylinder the pressure of the liquid column is relieved, causing clutch release. This pressure is restored, upon the movement of the abutment to a position closing communication between the high and low pressure sides of the cylinder. This might happen a number of times in the interval required for clutch engagement under conditions when the differential speeds of the driven and driving shaft is relatively great, but even when the auto vehicle is travelling with the clutch fully engaged, the slight inevitable speed differential between the driving and driven shafts due to slow leakage past the joints of the liquid confining members of the clutch, will occasionally bring the abutment chamber into pressure releasing position and cause undesired release of the clutch.

It has been proposed to avoid this periodic fluctuation of the clutching pressure by the provision of two pistons on the drive shaft, rotating in the same phase, each in its individual cylinder, each cylinder having an abutment, a by-pass about the abutment, and an adjustable throttling means for the by-pass, the abutments being intergeared with the drive shaft and arranged at diametrically opposed points in their respective cylinders, so that when one piston is passing through its abutment, the other is closed.

In such a construction the conditions of operation are as follows, it being assumed that both throttling means are set to define the same cross-sectional area in the two by-passes. The load of the driven member or such portion of it as is determined by the degree of throttling of the by-passes is borne equally by both pistons, while both abutments are in closed position. Now, when one abutment reaches the piston-passing phase with its transition chamber open to both sides of the cylinder, the piston of that cylinder will be relieved of its share of the load, which share will be added to the load borne by the other piston. This will increase the pressure of the last named piston against the liquid column in its cylinder, increasing momentarily the velocity of displacement of liquid through the throttled by-pass of said cylinder. This would ordinarily produce slippage of the clutch.

In my co-pending application Serial No. 331,226, filed April 23, 1940, I have disclosed a double acting clutch of the type described, in which means are provided to prevent clutch slippage due to the increased velocity of displacement as described. In the disclosure of said application I have provided means for further throttling said by-pass to reduce the accelerated velocity flow through said by-pass, to such an extent that the flow will be the same as it was before the piston of said cylinder was called upon the bear the load of both pistons. Such means as disclosed provides automatic compensation for variation in pressure between the cylinders after the initial throttling of the by-pass by manual means.

In my said co-pending application I also provide that when the cross-section of one by-pass is thus reduced, the cross-section of the opposite by-pass is correspondingly increased, and after the said abutment has moved to closed position, the by-pass cross-sections are equalized and an equal proportion of the load is again carried by both pistons.

One of the objects of the present invention is to provide a clutch in which the throttling means for the by-passes are automatically operated upon acceleration or deceleration of the driving member.

Another object of the present invention is to automatically and equally operate the throttling means for both by-passes when it becomes necessary through the opening of one abutment to restrict one of them, by pressure derived from the pressure side of that cylinder whose abutment is, at the time, closed.

A further object of the invention is to provide a hydraulic clutch of the type described in which the throttling means for the by-passes operate reciprocably in a direction perpendicular to the plane of rotation of the clutch, whereby the pressure required to operate said means will not be affected by centrifugal force.

Another object of the invention is to provide an adjustable stop to determine the inoperative position of the by-pass throttling means, whereby the idling speed of the driving member may be regulated.

Still another object of the invention is to correlate manual operation of the clutch with automatic operation.

Other objects will appear as the following detailed description of a preferred embodiment of the invention proceeds.

In the drawings:

Figure 3 is a horizontal section taken on the line 3—3 of Figure 2;

Figure 4 is a horizontal section taken on the line 4—4 of Figure 2, and with Figure 3 illustrates the interconnection of the various pressure control lines;

Figure 6 is an elevational view of a modification of the clutch which combines manual control with automatic control.

Figure 1:
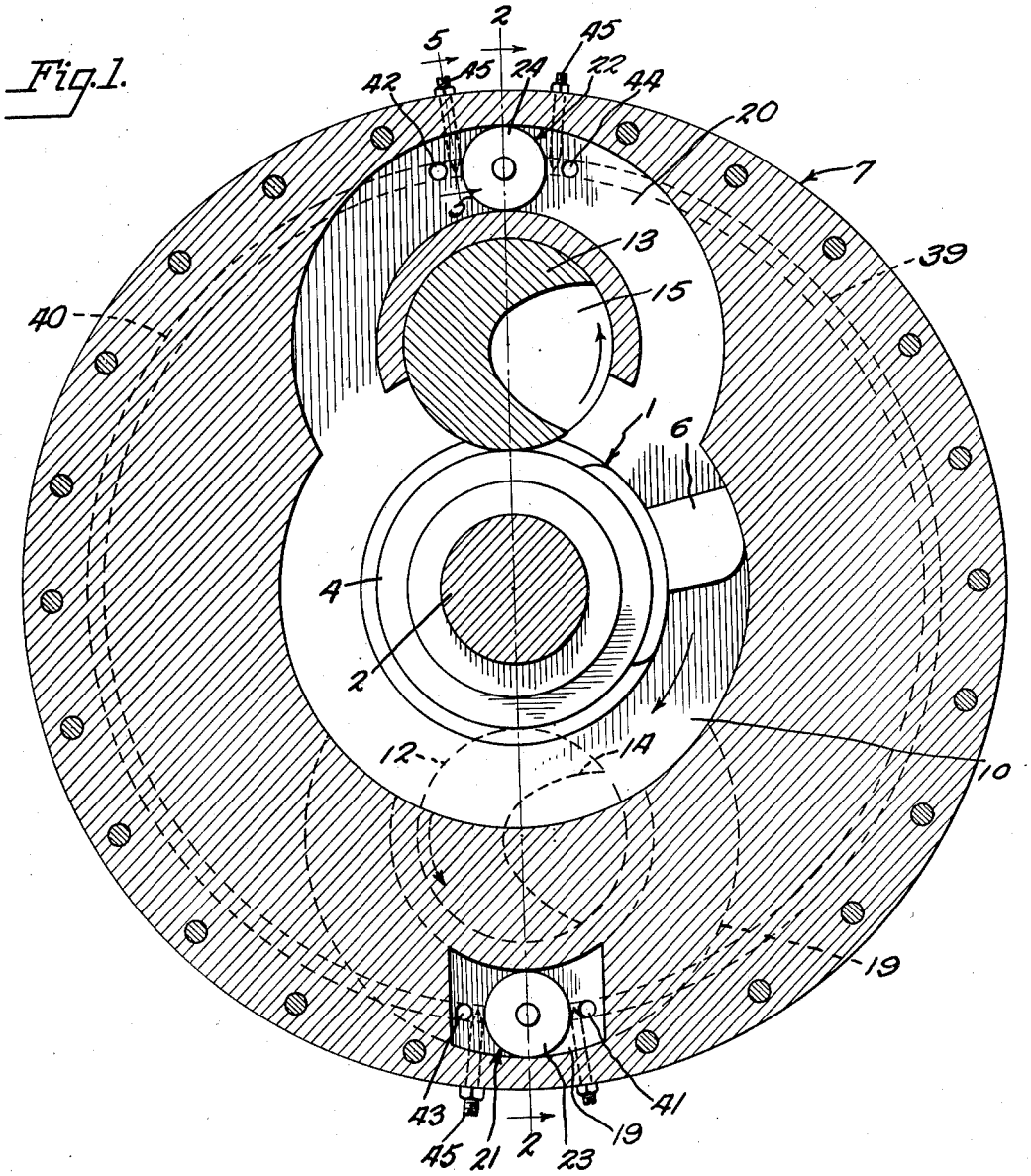
Figure 1 is a vertical sectional view through the clutch illustrating one cylinder and associated parts, and is taken on the line 1—1 of Figure 2.

Referring to the drawings in detail, the clutch comprises a driving member 1, consisting of a drive shaft 2 and the rotors 3 and 4 carrying pistons 5 and 6, and a driven member 7, including a casing 8 provided with annular cylinders 9 and 10 and the driven shaft 11. Pistons 5 and 6 rotate in the same phase and are mounted abreast of one another and occupy a common radial plane extending radially from the longitudinal axis of the drive shaft, and are spaced along the shaft a distance equal to the spacing of the cylinders 9 and 10 in which they rotate.

Rotary abutments 12 and 13, provided with transition chambers 14 and 15 which accommodate the pistons during their passage through the abutments, are mounted in bearings and extend across the cylinders 9 and 10, the abutments being mounted at diametrically opposed points within their respective cylinders.

The abutments, as the name implies, form barriers across the cylinders against which the pistons force a body of fluid, the cylinders being filled with a fluid such as oil or the like. The abutments are geared by means of gears 16 and 17 and 18 for synchronous rotation with the pistons and, due to the fact that they occupy opposed positions within their respective cylinders, only one of the abutments will break its seal at a time, the other cylinder maintaining its pressure.

Although the drawings illustrate certain structural features for cooperative relationship between the cylinder, rotor, piston and abutment to provide for a diminution of the time necessary for the seal to be broken during the passage of the piston through the abutment, this structure is described in detail in my co-pending application Serial No. 372,923, and all that is deemed necessary to bear in mind, insofar as the operation of the present application is concerned is that the rotor and abutment be in peripheral contact.

To permit free movement of the piston within the cylinders for clutch release, by-passes 19 and 20 are formed around the abutments, the by-passes being at least equal in cross-section to the cylinders and providing unobstructed passage for the fluid which is set in motion by the pistons. As long as the pistons may move the fluid freely, there will be no motion imparted to the casing.

In order to retard the movement of the fluid, and thereby create a force to turn the casing, throttling means 21 and 22 are provided, mounted in the casing for controlled, reciprocal movement across the by-passes. The throttling means comprise baffles 23 and 24 of sufficient size to completely block the by-passes when in projected position, and pistons 25 and 26 fixed to the inner ends of the baffles. The pistons have a sliding fit within piston chambers 27 and 28, and the throttling means are urged to retracted or inoperative position by means of light coil springs 29 and 30, positioned within the piston chambers and bearing against the pistons.

The inoperative position of the throttling means is determined by the setting of screw-threaded stop pins 31 and 32 to regulate the idling speed of the driving means while the clutch is in released position. Lock nuts 33 and 34 hold the stop pins in adjusted position. Projections 35 and 36 extend axially from the baffles 23 and 24 to seat in recesses 37 and 38, formed in the walls of the by-passes 19 and 20, when the baffles are almost completely blocking the by-passes and function as dash pots to prevent shocks due to sudden locking of the clutch. Due to the fact that the movement of the throttling means is perpendicular to the plane of rotation of the clutch, centrifugal force caused by rotation of the casing will not affect the throttling means.

Cored passageways are formed in the casing to provide control means for the baffles. These control lines communicate with the by-passes and the throttling means piston chamber in order that pressures and pressure changes within the cylinders 9 and 10 may serve to move the baffles to change the cross-sectional area of the by-passes. It will be noted that one of the by-passes, the by-pass 19 as shown on the drawings, is offset to bring the central portions of the by-pass into alignment in a common vertical plane. This is done to simplify the arrangement of the control lines and to permit both of the throttling means to operate in the same direction.

Passageways 39 and 40 follow annular paths through the casing and interconnect the piston chambers 27 and 28, and ensure equalization of pressure upon the pistons 25 and 26. Passageways 41 and 42 communicate with the by-passes 19 and 20 and the passageways 39 and 40, respectively, to transmit pressures and pressure variations from the cylinders 9 and 10, to one end of the piston chambers 27 and 28. Fluid is brought to the opposite end of the piston chambers by means of the passageways 43 and 44 which are open to the by-passes 19 and 20. Each of the passageways is provided with a needle valve 45 to regulate the size of the openings.

To properly follow the action of the pressure and the changes in direction of pressure which control the throttling means, it is necessary to consider Figures 3 and 4 of the drawings together and to follow the control lines from one chamber to another. The arrows indicate the direction of oil movement through the by-passes as well as the direction of fluid pressure application in the control lines.

As the pistons 5 and 6 move slowly in their respective cylinders 9 and 10 in the direction of the arrow in Figure 1, the fluid with which the cylinders are filled is set in motion and flows freely around the cylinders and their by-passes with no appreciable pressure, and the casing remains stationary. When it is desired to engage the clutch, the driving member is speeded up, creating a pressure against the fluid within the cylinders. The sudden build-up of pressure is transmitted by means of the control lines 41 and 42 to the piston chambers 27 and 28, forcing the pistons 23 and 24 forward in the chambers and projecting the baffles into the by-passes, restricting the flow of fluid through the by-passes. As soon as the fluid flow is restricted, the pressure increases and causes the casing to rotate. The control lines 41 and 42 communicating with the by-passes at points between the baffles and the driving pistons 5 and 6 will be subjected to the high pressures which are set up in this area, and transmit such pressures to the throttling means 21 and 22. The baffles, therefore, will progressively move across the by-passes more and more restricting the flow of fluid, greater restriction causing higher pressure, and higher pressure causing further movement of the baffles. This will continue until the baffles have completely blocked the by-passes at which time the clutch will be completely engaged and the driving member and the casing, which is the driven member, will rotate in 1:1 ratio, discounting unavoidable leakage between the parts.

During the interval from the time the baffles first begin movement until the clutch is completely engaged, the driving pistons 5 and 6 will each pass through its respective abutment a number of times. Each time that an abutment opens to allow passage of its piston, the seal is broken between the abutment and the rotor carrying the piston, and pressure within that cylinder is suddenly released. While both abutments are closed, the driving force is divided equally between the two cylinders but, as soon as one abutment opens the entire driving force is applied to the fluid in the other cylinder. This causes a momentary increase in the speed of the driving member which if not checked would cause slippage and a jerky operation of the clutch.

Due to the construction of the present invention, the momentary increase in speed causes an increase in pressure in that cylinder which still maintains its pressure which projects the by-pass baffle further across the by-pass, thus compensating for the sudden surge and preventing slipping. The interconnecting control lines 39 and 40 provide for an equalization of pressure upon the throttling means, whereby both baffles will be moved in unison upon variation in pressure in either cylinder. When pressure in one cylinder is released by opening of the abutment, both baffles move further across their respective by-passes under the sudden build-up of pressure in the other cylinder, but this movement is nearly in conformity with the normal progressive movement of the baffle and smoothness of operation of the clutch results.

Acceleration of the driving member causes the clutch to engage, and as long as the driving power is maintained the clutch will remain in engagement. Upon deceleration of the driving member the driven member tends to maintain its speed and overrun the driving member. This will cause a reversal of pressure and the pressure will be applied to the opposite side of the baffles. Control lines 42 and 44 will transmit this pressure to the inner ends of the piston chambers 27 and 28, drawing the baffles into the casing, and permitting unobstructed passage of the fluid through the by-pass, thus releasing the clutch.

Figure 2:
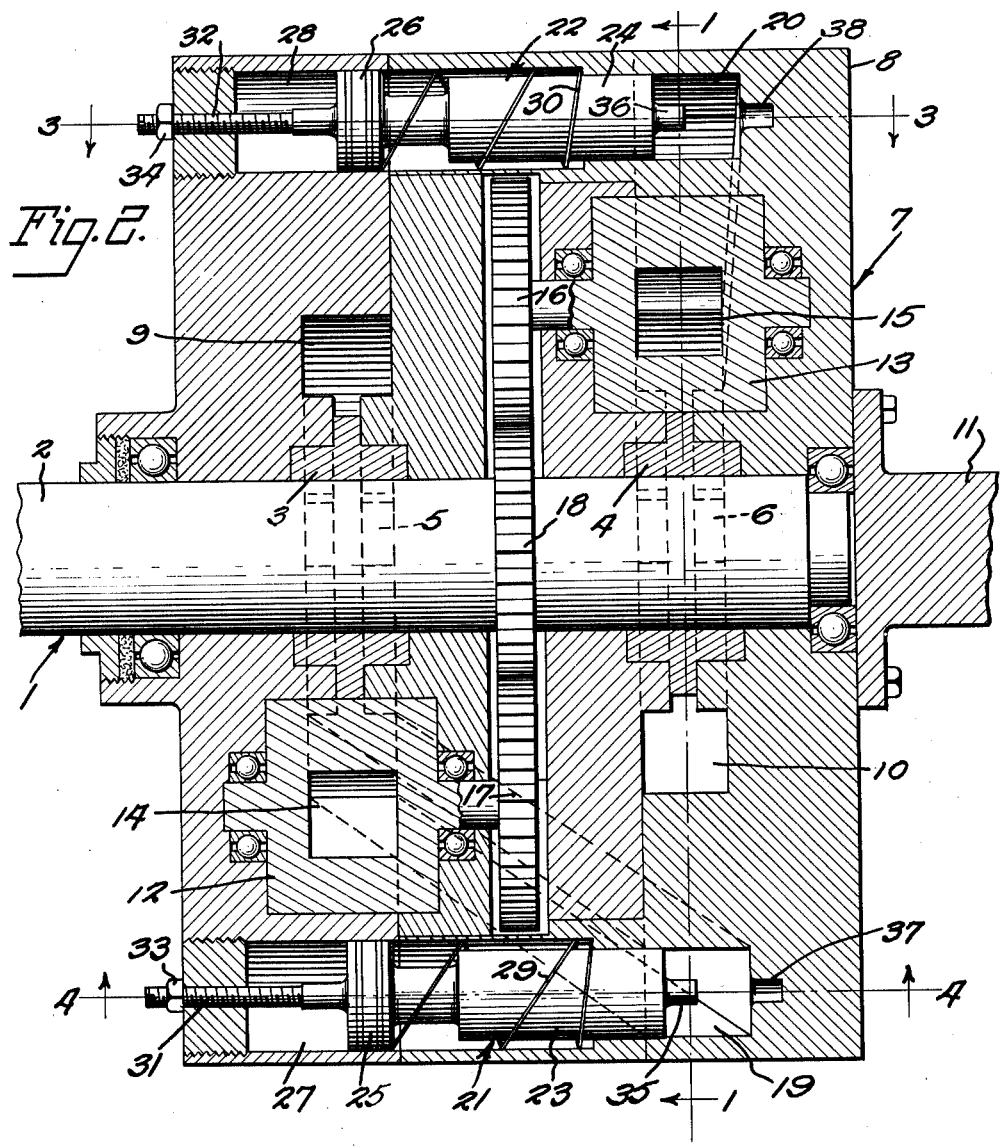
Figure 2 is a vertical sectional view taken on the line 2—2 of Figure 1.
Figure 5:
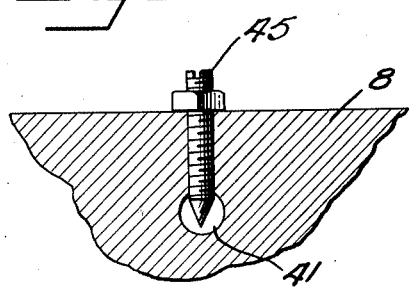
Figure 5 is a fragmentary section taken on the line 5—5 of Figure 1 showing one of the flow regulating valves.

The position which the baffles assume when drawn back to inoperative position determines the idling speed of the driving member. It will be noted from Figures 2, 3 and 4 of the drawings that the by-passes widen out at their centers so that their cross-section at this point is of greater area than that of the annular cylinders. The inoperative position of the throttling means may be adjusted by the screws 31 and 32, and when this position is such that the unobstructed cross-section of the by-passes closely approximate that of the annular cylinders, the idling speed of the driving member is very low. The greater the cross-sectional area of the by-pass that is left unobstructed the greater the idling speed.

In Figure 6 manual means are shown to supplement the automatic operation of the clutch. Each of the throttling means is provided with a connecting rod 46 and the two rods are pivotally secured to the opposite ends of a crosshead 47, said crosshead being pivotally secured to a collar which is mounted for sliding movement upon the drive shaft 2. The crosshead may be provided with any suitable linkage (not shown) for operation by a pedal. This type of clutch may be operated manually or automatically, but in either event variations in pressure between the cylinders will be compensated for automatically.

This clutch is constructed and operates in exactly the same manner as the clutch previously described, except that the throttling means may be moved manually to either clutch-engage or clutch-release position if desired. Stops 31a, equivalents of the stops 31, are provided to limit the retroactive movements of the pistons. The automatic control is sufficiently strong to move the crosshead back and forth upon the shaft 2, and the pivoted connections between the rods and the crosshead, and the crosshead and its supporting collar, permits automatic adjustment of position of the two throttling means relative to each other in the event of unequal pressures upon their respective control pistons. Manual operation of the clutch is used when unusually quick engagement or disengagement of the clutch is desired. The operating pedal or lever and linkage which may in practice be connected with the sliding collar on which the crosshead is mounted may be of a type to move back and forth with the crosshead when the clutch is automatically operated.

What I claim is:

1. In a hydraulic clutch having a pair of aligned pistons, rotating in the same phase, each in its individual annular cylinder formed in a casing and being filled with a fluid, the pistons being the driving members and the casing the driven member, each cylinder having an abutment, the abutments being arranged at diametrically opposed points in their respective cylinders, and a by-pass around each abutment; throttling means for said by-passes, and means communicating with the respective cylinders to control said throttling means, whereby acceleration and deceleration of the driving means causes said throttling means to vary the cross-sectional area of the by-passes.

2. In a hydraulic clutch having a pair of aligned pistons, rotating in the same phase, each in its individual annular cylinder formed in a casing and being filled with a fluid, the pistons being the driving members and the casing the driven member, each cylinder having an abutment, the abutments being arranged at diametrically opposed points in their respective cylinders, and a by-pass around each abutment; throttling means for said by-passes, a piston carried by each throttling means, the throttling means and their pistons being mounted for reciprocation within the casing, and control means for said throttling means, communicating with the respective cylinders and with the opposite sides of the throttling means piston whereby acceleration and deceleration of the driving means causes said throttling means to vary the cross-sectional area of the by-passes.

3. In a hydraulic clutch having a pair of aligned pistons, rotating in the same phase, each in its individual annular cylinder formed in a casing and being filled with a fluid, the pistons being the driving members and the casing the driven member, each cylinder having an abutment, the abutments being arranged at diametrically opposed points in their respective cylinders, and a by-pass around each abutment; throttling means for said by-passes, a piston carried by each throttling means, the throttling means and their pistons being mounted for reciprocation within the casing, control means communicating with the respective cylinders and one face of the respective throttling means piston, and control means communicating with the respective cylinders and the opposite face of the respective throttling means piston whereby acceleration and deceleration of the driving means causes said throttling means to vary the cross-sectional area of the by-passes.

4. In a hydraulic clutch as claimed in claim 3, means to normally urge the throttling means to inoperative position.

5. In a hydraulic clutch having a pair of aligned pistons, rotating in the same phase, each in its individual annular cylinder formed in a casing and being filled with a fluid, the pistons being the driving members and the casing the driven member, each cylinder having an abutment, the abutments being arranged at diametrically opposed points in their respective cylinders, and a by-pass around each abutment; throttling means in said by-passes, and control lines each communicating with one of the cylinders and with each of the throttling means, whereby the throttling means are actuated to vary the cross-sectional area of the by-passes to provide compensation for pressure variations between the cylinders.

6. In a hydraulic clutch having a pair of aligned pistons, rotating in the same phase, each in its individual annular cylinder formed in a casing and being filled with a fluid, the pistons being the driving members and the casing the driven member, each cylinder having an abutment, the abutments being arranged at diametrically opposed points in their respective cylinders, and a by-pass around each abutment; throttling means in said by-passes, control lines each communicating with one of the cylinders and with its by-pass throttling means, and control lines interconnecting said throttling means whereby the throttling means are actuated to vary the cross-sectional area of the by-passes to provide compensation for pressure variations between the cylinders.

7. In a hydraulic clutch having a pair of aligned pistons, rotating in the same phase, each in its individual annular cylinder formed in a casing and being filled with a fluid, the pistons being the driving members and the casing the driven member, each cylinder having an abutment, the abutments being arranged at diametrically opposed points in their respective cylinders, and a by-pass around each abutment; throttling means in said by-passes, control lines each communicating with one cylinder and the by-pass throttling means of the other cylinder, whereby the throttling means of one cylinder is actuated to vary the cross-sectional area of its by-pass to provide compensation for pressure loss in the other cylinder.

8. In a hydraulic clutch having a pair of aligned pistons, rotating in the same phase, each in its individual annular cylinder formed in a casing and being filled with a fluid, the pistons being the driving members and the casing the driven member, each cylinder having an abutment, the abutments being arranged at diametrically opposed points in their respective cylinders, and a by-pass around each abutment; throttling means for said by-passes, a piston carried by each throttling means, the throttling means and their pistons being mounted for reciprocation within the casing, control lines communicating with the respective cylinders and one side of the respective throttling means pistons, control lines communicating with the respective cylinders and the opposite side of the respective throttling means pistons, and control lines interconnecting the said throttling means whereby said throttling means are actuated to vary the cross-sectional area of the by-passes under acceleration and deceleration of the driving means and to provide compensation for pressure variations between the cylinders.

9. In a hydraulic clutch as claimed in claim 1, adjustable stops for said throttling means to determine the idling speed of the driving means.

10. In a hydraulic clutch claimed in claim 1, means to normally urge the throttling means to inoperative position, and adjustable stops for said throttling means to determine the idling speed of the driving means.

11. In a hydraulic clutch having a pair of aligned pistons, rotating in the same phase, each in its individual annular cylinder formed in a casing and being filled with a fluid, the pistons being the driving members and the casing the driven member, each cylinder having an abutment, the abutments being arranged at diametrically opposed points in their respective cylinders, and a by-pass around each abutment; throttling means for said by-passes, said throttling means mounted in the casing for reciprocation in a direction perpendicular to the plane of rotation of the clutch, and means communicating with the respective cylinders to control said throttling means, whereby acceleration and deceleration of the driving means causes said throttling means to vary the cross-sectional area of the by-passes.

12. In a hydraulic clutch having a pair of aligned pistons, rotating in the same phase, each in its individual annular cylinder formed in a casing and being filled with a fluid, the pistons being the driving members and the casing the driven member, each cylinder having an abutment, the abutments being arranged at diametrically opposed points in their respective cylinders, and a by-pass around each abutment; throttling means for said by-passes, and means communicating with the respective cylinders to control said throttling means, and manual means to move the throttling means to and from operative position.

13. In a hydraulic clutch having a plurality of pistons, each in its individual annular cylinder formed in a casing and being filled with a fluid, the pistons and casing being driving and driven members, each cylinder having an abutment, the pistons and abutments being so arranged that the abutments reach piston-passing position in alternation, and a by-pass around each abutment; throttling means for said by-passes, and means communicating with the respective cylinders to control said throttling means, whereby acceleration and deceleration of the driving means causes said throttling means to vary the cross-sectional area of the by-passes.

14. In a hydraulic clutch having a plurality of pistons, each in its individual annular cylinder formed in a casing and being filled with a fluid, the pistons and casing being driving and driven members, each cylinder having an abutment, the pistons and abutments being so arranged that the abutments reach piston-passing position in alternation, and a by-pass around each abutment; throttling means for said by-passes, a piston carried by each throttling means, the throttling means and their pistons being mounted for reciprocation within the casing, and control means for said throttling means, communicating with the respective cylinders and with the opposite sides of the throttling means piston whereby acceleration and deceleration of the driving means causes said throttling means to vary the cross-sectional area of the by-passes.

15. In a hydraulic clutch having a plurality of pistons, each in its individual annular cylinder formed in a casing and being filled with a fluid, the pistons and casing being driving and driven members, each cylinder having an abutment, the pistons and abutments being so arranged that the abutments reach piston-passing position in alternation, and a by-pass around each abutment; throttling means for said by-passes, a piston carried by each throttling means, the throttling means and their pistons being mounted for reciprocation within the casing, control means communicating with the respective cylinders and one face of the respective throttling means piston, and control means communicating with the respective cylinders and the opposite face of the respective throttling means piston whereby acceleration and deceleration of the driving means causes said throttling means to vary the cross-sectional area of the by-passes.

FRANK BERRY.